United States Patent
Stoschek et al.

(10) Patent No.: US 9,052,214 B2
(45) Date of Patent: Jun. 9, 2015

(54) NAVIGATION SYSTEM FOR A MOTOR VEHICLE, METHOD FOR OPERATING A NAVIGATION SYSTEM AND MOTOR VEHICLE INCLUDING A NAVIGATION SYSTEM

(75) Inventors: Arne Stoschek, Palo Alto, CA (US); Brian Ng, Los Altos, CA (US); Thomas Chan, Mountain View, CA (US); Daniel Rosario, Santa Cruz, CA (US)

(73) Assignee: Volkswagen AG, Wolfsburg (DE)

( * ) Notice: Subject to any disclaimer, the term of this patent is extended or adjusted under 35 U.S.C. 154(b) by 2436 days.

(21) Appl. No.: 11/439,315

(22) Filed: May 22, 2006

(65) Prior Publication Data

US 2007/0271035 A1    Nov. 22, 2007

(51) Int. Cl.
*G01C 21/36* (2006.01)

(52) U.S. Cl.
CPC ........ *G01C 21/3682* (2013.01); *G01C 21/3697* (2013.01)

(58) Field of Classification Search
USPC ........................................................ 701/209
See application file for complete search history.

(56) References Cited

U.S. PATENT DOCUMENTS

| | | | |
|---|---|---|---|
| 5,508,917 A | 4/1996 | Siegle et al. | |
| 5,839,086 A | 11/1998 | Hirano | |
| 6,148,261 A | 11/2000 | Obradovich et al. | |
| 6,157,155 A | 12/2000 | Kobayashi | |
| 6,285,317 B1 | 9/2001 | Ong | |
| 6,324,467 B1 | 11/2001 | Machii et al. | |
| 6,336,073 B1 | 1/2002 | Ihara et al. | |
| 6,647,270 B1 | 11/2003 | Himmelstein | |
| 6,707,378 B2 | 3/2004 | MacNeille et al. | |
| 6,745,111 B2 | 6/2004 | Maruyama et al. | |
| 6,765,495 B1 | 7/2004 | Dunning et al. | |
| 6,826,472 B1 | 11/2004 | Kamei et al. | |
| 6,862,524 B1 | 3/2005 | Nagda et al. | 701/209 |
| 6,868,331 B2 | 3/2005 | Hanebrink | |
| 6,898,516 B2 | 5/2005 | Pechatnikov et al. | |
| 6,965,829 B2 | 11/2005 | Yamadaji et al. | |

(Continued)

FOREIGN PATENT DOCUMENTS

| | | |
|---|---|---|
| DE | 40 39 887 | 6/1992 |
| DE | 698 15 940 | 6/2004 |

(Continued)

OTHER PUBLICATIONS

PCT International Search Report and Written Opinion, PCT International Application No. PCT/EP2007/001906, dated Jun. 14, 2007 (English-language translation provided).

(Continued)

*Primary Examiner* — Shelley Chen
(74) *Attorney, Agent, or Firm* — Kenyon & Kenyon LLP

(57) ABSTRACT

In a navigation system for a motor vehicle, the navigation system includes an off-board navigation system that is spatially separate from the motor vehicle, a wireless communication connection between the off-board navigation system and the motor vehicle to transmit a suggested route for the motor vehicle and/or a map display of the environment of the motor vehicle from the off-board navigation system to the motor vehicle, and a man-machine interface arranged in the motor vehicle, to output the suggested route or the map display to an operator of the motor vehicle, in connection or together with an item of additional information, the provision of the additional information being accessible to a third party.

12 Claims, 8 Drawing Sheets

(56) References Cited

U.S. PATENT DOCUMENTS

| | | |
|---|---|---|
| 6,996,469 B2 | 2/2006 | Lau et al. |
| 7,046,168 B2 | 5/2006 | Tsuboi |
| 7,062,375 B2 * | 6/2006 | Hatano ................ 701/207 |
| 7,103,368 B2 * | 9/2006 | Teshima ................ 455/456.3 |
| 7,110,882 B2 | 9/2006 | Moser et al. |
| 7,233,864 B2 | 6/2007 | Moser et al. |
| 7,269,503 B2 | 9/2007 | McGrath |
| 7,272,357 B2 | 9/2007 | Nishiga et al. |
| 7,286,825 B2 | 10/2007 | Shishido et al. |
| 7,383,123 B2 | 6/2008 | Park |
| 2001/0019309 A1 | 9/2001 | Saeki et al. |
| 2001/0020211 A1 | 9/2001 | Takayama et al. |
| 2001/0020213 A1 * | 9/2001 | Hatano ................ 701/207 |
| 2002/0032035 A1 * | 3/2002 | Teshima ................ 455/456 |
| 2002/0177948 A1 | 11/2002 | Upparapalli et al. |
| 2003/0028314 A1 | 2/2003 | Nagamune |
| 2003/0083809 A1 * | 5/2003 | Hatano ................ 701/207 |
| 2003/0102997 A1 | 6/2003 | Levin et al. |
| 2003/0234720 A1 | 12/2003 | MacNeille et al. |
| 2004/0015292 A1 | 1/2004 | Wiio et al. |
| 2004/0082350 A1 | 4/2004 | Chen et al. |
| 2004/0204848 A1 * | 10/2004 | Matsuo et al. ................ 701/211 |
| 2004/0249565 A1 | 12/2004 | Park |
| 2005/0197842 A1 | 9/2005 | Bergmann et al. |
| 2005/0216147 A1 | 9/2005 | Ferman |
| 2005/0222760 A1 | 10/2005 | Cabral et al. |
| 2005/0248484 A1 | 11/2005 | Stoschek et al. |
| 2005/0270311 A1 | 12/2005 | Rasmussen et al. |
| 2006/0074553 A1 | 4/2006 | Foo et al. |
| 2006/0161341 A1 | 7/2006 | Haegebarth et al. |
| 2006/0164412 A1 | 7/2006 | Dupont et al. |
| 2007/0093958 A1 | 4/2007 | Jonsson et al. |
| 2007/0233369 A1 | 10/2007 | Ng et al. |
| 2007/0233371 A1 | 10/2007 | Stoschek et al. |
| 2007/0233375 A1 * | 10/2007 | Garg et al. ................ 701/211 |
| 2007/0233377 A1 * | 10/2007 | Salay et al. ................ 701/211 |
| 2008/0065322 A1 | 3/2008 | Ng et al. |

FOREIGN PATENT DOCUMENTS

| | | |
|---|---|---|
| DE | 10 2004 061 782 | 9/2005 |
| DE | 10 2005 013 648 | 9/2006 |
| EP | 0 243 635 | 1/1993 |
| EP | 0 694 895 | 1/1996 |
| EP | 0 875 730 | 11/1998 |
| EP | 1 033 692 | 9/2000 |
| EP | 1 035 531 | 9/2000 |
| EP | 1 168 286 | 1/2002 |
| EP | 1 376 059 | 1/2004 |
| EP | 0 990 119 | 11/2005 |
| EP | 1 757 904 | 2/2007 |
| FR | 2 634 707 | 2/1990 |
| JP | 06 036186 | 2/1994 |
| JP | 10 241094 | 9/1998 |
| JP | 2002-131065 | 5/2002 |
| JP | 2004-227162 | 8/2004 |
| WO | WO 98/59215 | 12/1998 |
| WO | WO 2005/124280 | 12/2005 |

OTHER PUBLICATIONS

Bleyer et al., "Car-to-Car Communication," p. 16-19, Apr. 2002. (Translated).

PCT International Search Report and Written Opinion of the International Searching Authority, PCT International Patent Application No. PCT/EP2007/001904, dated Jun. 14, 2007, (English-language translation provided).

PCT International Search Report and Written Opinion of the International Searching Authority, PCT International Patent Application No. PCT/EP2007/001905, dated Sep. 12, 2007, (English-language translation provided).

Periodical Autoconnect 2005, Vereinigte Motor-Verlage GmbH & Co. KG (United Motor publishing house, Inc.), Leuschnerstr. 1, 70174 Stuttgart, Federal Republic of Germany, pp. 18 and 21 (English-language translation provided).

Office Action, U.S. Appl. No. 11/501,554, dated Oct. 13, 2010.

* cited by examiner

NAVIGATION SYSTEM FOR A MOTOR VEHICLE, METHOD FOR OPERATING A NAVIGATION SYSTEM AND MOTOR VEHICLE INCLUDING A NAVIGATION SYSTEM

INCORPORATION BY REFERENCE

This application is related to U.S. patent application Ser. No. 11/395,705, filed on Mar. 31, 2006, and U.S. Provisional Application No. 60/800,222, filed on May 11, 2006, each of which is expressly incorporated herein in its entirety by reference thereto.

FIELD OF THE INVENTION

The present invention relates to a navigation system, a method for operating a navigation system and a motor vehicle including a navigation system.

BACKGROUND INFORMATION

European Published Patent Application No. 0 875 730 and German Published Patent Application No. 698 15 940 describe a map data display device for use in a vehicle navigation device having a data-conversion device for recording points of map data according to a map, from a viewpoint through a viewing line originating from the viewpoint and having an angle of depression with respect to the plane of the map, and for perspectively projecting the points of the map data onto a viewing plane, which is fixed perpendicularly to the viewing line and is a predefined distance from the location, in order to generate map display data. This produces a bird's-eye view of an environment. A navigation system having a bird's-eye view of an environment is also described in French Published Patent Application No. 2 634 707 and the periodical AUTOCONNECT 2005, Vereinigte Motor-Verlage GmbH & Co. KG (United Motor Publishing House, Inc.), Leuschnerstr. 1, 70174 Stuttgart, Federal Republic of Germany, pages 18 and 21.

European Published Patent Application No. 0 990 119 describes a digital personal communication device having a processor, a memory that the processor can access, and a display that is connected to the processor. The display displays map data and a position of the digital personal communication device with respect to the map data, and the map data includes route points, i.e., coordinates, as instructed by the processor. Furthermore, the digital personal communication device includes an input device for forming queries for map information and for selecting route points, and a GPS receiver that is connected to the processor. The processor is programmed to process data it receives from the GPS receiver such that the position of the digital personal communication device is able to be determined from the data. Moreover, the digital personal communication device includes a transmitter that is connected to the processor, the processor programmed such that, utilizing the transmitter, it requests map data from a map memory and a transmission device, processes the map information it obtained from the map memory and the transmission device, and determines the availability of additional stored data regarding route points in the memory during the selection of one of the route points by the input device, and, using the transmitter, it requests additional stored data from the map memory and the transmission device during the selection of one of the route points if additional, stored data are not available in the memory.

SUMMARY

Example embodiments of the present invention may provide for improvement in the navigation for a motor vehicle. In this context, a high-quality navigation may be provided that may require limited operating effort.

A navigation system for a motor vehicle may include: an off-board navigation system, the off-board navigation system spatially separate from the motor vehicle, e.g., for calculating a suggested route for the motor vehicle; a wireless communication connection between the off-board navigation system and the motor vehicle for transmission of a suggested route for the motor vehicle and/or a display of a map of the environment of the motor vehicle from the off-board navigation system to the motor vehicle; and a man-machine interface, arranged in the motor vehicle, for outputting the suggested route or the map display to an operator of the motor vehicle, in connection or together with an additional item of information, the supply of the additional item of information being accessible to a third party.

A suggested route may include, for example, a setpoint route to a destination and/or information regarding a setpoint direction of travel. An off-board navigation system may be arranged as stationary server, for example.

A wireless communication connection may also include a non-wireless part. A wireless communication connection may include, for example, a communication connection that is wireless in the direction to at least the motor vehicle. A wireless communication connection may include, for example, a wireless connection to the Internet (such as WLAN). Wireless communication connections may also be WIFI, WINIAX, RF, mobile radio, etc. It may be provided that—depending on certain criteria—a selection is (automatically) made from among alternative wireless communication connections. These criteria may include, for example, cost, availability and/or bandwidth, etc. Moreover, a seamless transition between online and offline operation may be provided, a suggested route, possibly including map information, being stored in an on-board memory.

A map display may include a map, a satellite image, a 3D graphical representation, etc. The map, the satellite image or the 3D graphical representation may be shown in a plan view, a bird's-eye view, a first-person view, etc.

Additional information, whose provision is accessible to a third party, may include advertising, for example, which is made available to the third party for a fee.

The display of the additional information may be a function of the position of the motor vehicle, the time, a search history and/or a customer preference, etc. That the display of the additional information is a function of the motor vehicle's position, the time, a search history and/or a customer preference, etc., may mean that the type of display of the additional information is made to depend on this information and/or that it is made dependent on this information whether a display of the additional information takes place at all.

The additional information may be displayable as text, logo and/or image, etc.

The additional information may be displayed by superimposing it on the map display.

The additional information may be output in acoustic form.

In a navigation system for a motor vehicle, the navigation system includes: an off-board navigation system which is spatially separate from the motor vehicle, e.g., for calculating a suggested route for the motor vehicle; a wireless communication connection between the off-board navigation system and the motor vehicle for transmission of a suggested route for the motor vehicle and/or a map display of the environment of the motor vehicle from the off-board navigation system to the motor vehicle; and a man-machine interface arranged in the motor vehicle, for outputting the suggested route or the map display to an operator of the motor vehicle, in connection or together with commercial advertising.

A suggested route may be, for example, a setpoint route to a destination and/or information regarding a setpoint direction of travel.

An off-board navigation system may be arranged as stationary server, for example.

A wireless communication connection may also include a non-wireless part. A wireless communication connection may include, for example, a communication connection that is wireless at least in the direction of the motor vehicle. A wireless communication connection may include, for example, a wireless connection to the Internet (e.g., WLAN). Wireless communication connections may also be WIFI, WIMAX, RF, mobile radio communication, etc. It may be provided that—depending on certain criteria—an (automatic) selection is made among alternative wireless communication connections. These criteria may include, for example, cost, availability and/or bandwidth, etc. Moreover, a seamless transition between online and offline operation may be provided, a suggested route, possibly including map information, being stored in an on-board memory.

A map display may include a map, a satellite image, a 3D graphical representation, etc. The map, the satellite image or the 3D graphical representation, etc., may be shown in a plan view, a bird's-eye view, a first-person view, etc., for example.

The display of the commercial advertising may be a function of the position of the motor vehicle, the time, a search history and/or a customer preference, etc. That the display of the commercial advertising may be a function of the position of the motor vehicle, the time, a search history and/or a customer preference, etc., may mean that the type of display of the commercial advertising is made dependent on this information and/or that it is made dependent on this information whether a display of the commercial advertising will take place at all.

The commercial advertising is displayable as text, logo and/or image, etc.

The commercial advertising may be displayed by superimposing it on the map display.

The commercial advertising may be output in acoustic form.

In a method for operating a navigation system for a motor vehicle, which may include, for example, one or more of the aforementioned features, the navigation system having an off-board navigation system, which is spatially separate from the motor vehicle and is used, for example, to calculate a suggested route for the motor vehicle, a suggested route for the motor vehicle and/or a map display of the environment of the motor vehicle is wirelessly transmitted from the off-board navigation system to the motor vehicle, e.g., with the aid of a wireless Internet connection; commercial advertising is wirelessly transmitted from the off-board navigation system to the motor vehicle; and the commercial advertising is output to an operator of the motor vehicle.

A suggested route may include, for example, a setpoint route to a destination and/or information regarding a setpoint direction of travel.

An off-board navigation system may be arranged as stationary server, for example.

A map display may be a map, a satellite image, a 3D graphical representation, etc. The map, the satellite image or the 3D graphical representation may be shown in a plan view, a bird's-eye view, a first-person view, etc.

The suggested route or the map display may be output to an operator of the motor vehicle, e.g., in connection or together with the commercial advertising. Commercial advertising, e.g., for facilities such as service stations, gas stations, repair shops, car dealers, hotels, motels, restaurants, etc., along the suggested route may be displayed. This applies to a route preview, for example.

The commercial advertising may be displayed as a function of the position of the motor vehicle, the time, a search history and/or a customer preference, etc. That the display of the commercial advertising is a function of the position of the motor vehicle, the time, a search history and/or a customer preference, etc., may mean that the type of display of the commercial advertising is made dependent on this information and/or that it is made dependent on this information whether a display of the commercial advertising will take place at all.

The commercial advertising may be displayed as text, logo and/or image, etc.

The commercial advertisement may be displayed by superimposing it on the map display.

The commercial advertising may be output in acoustic form.

Revenue generated by the commercial advertising may accrue at least partially to the manufacturer of the motor vehicle.

Revenue generated by the commercial advertising may be split among the manufacturer of the motor vehicle, a provider of a wireless Internet connection via which the suggested route for the motor vehicle and/or the map display of the environment of the motor vehicle are/is transmitted from the off-board navigation system to the motor vehicle, and a provider of the map display, etc.

The user of the motor vehicle may be given or promised a rebate by the commercial advertising. This may occur, for example, with commercial advertising for service stations, gas stations, repair facilities, car dealers, hotels, motels, restaurants, etc. It is possible to provide exclusive price agreements between the manufacturer of the motor vehicle and the company that advertises by the commercial advertising.

The user of the motor vehicle may be given or promised a guaranteed parking space by the commercial advertising.

Revenue generated by the commercial advertising may be used at least partially for the expansion and/or maintenance of the navigation system. This may relate to an infrastructure of the navigation system on the off-board or on-board side.

The cost of an infrastructure for the wireless transmission of the suggested route for the motor vehicle and/or the map display of the environment of the motor vehicle from the off-board navigation system to the motor vehicle for at least one route segment may be borne at least partially by at least one sponsor.

Emergency information may be transmitted from the off-board navigation to the motor vehicle with a greater bandwidth than the commercial advertising.

Certain options, e.g., confidentiality options, may be offered to the user of a motor vehicle, for a fee. Such options, e.g., confidentiality options, may relate to the identity of the user, routes, times, etc.

Information regarding the position of the motor vehicle may be transmitted from the motor vehicle to the off-board navigation system. In this context, the information regarding the position of the motor vehicle is anonymized, for example. It may be made accessible to a third party for a fee. Specifically, processed information with regard to the positions of a plurality of motor vehicles may be made accessible. The information with respect to the position of the motor vehicle or the processed information with respect to the positions of a plurality of motor vehicles may be used to collect road tolls, improve the map displays, ascertain traffic information and/or optimize the traffic flow, etc.

The information with respect to an expected arrival time at a destination may be made accessibly to third parties, e.g., in anonymized form, for a fee. A bottleneck management with respect to facilities such as parking facilities, hotels, etc., may be implemented on the basis of this information.

Routes of motor vehicles may be logged. Such information makes it possible to make decisions regarding advertising along the road.

In a method for operating a navigation system for a motor vehicle, the navigation system including, e.g., one or a plurality of the aforementioned features, a suggested route for the motor vehicle is calculated as a function of a financial contribution of a sponsor, and the suggested route is output to an operator of the motor vehicle. A suggested route may be, for example, a setpoint route to a destination and/or a setpoint direction of travel. It may be provided in this context that alternative suggested routes are determined for the motor vehicle and a suggested route for the motor vehicle is selected from among substantially equal suggested routes as a function of a financial contribution of a sponsor. This may also be done in a type of auction mode.

The suggested route for the motor vehicle may be transmitted wirelessly, from an off-board navigation system to the vehicle, e.g., with the aid of a wireless Internet connection. An off-board navigation system may be arranged as a stationary server, for example.

In a motor vehicle, e.g., a motor vehicle that is suitable for a navigation system having one or a plurality of the aforementioned features, the motor vehicle includes a navigation system for determining a suggested route for the motor vehicle, a man-machine interface, assigned to the navigation system, for the output of the suggested route for the motor vehicle and/or a map display of the environment of the motor vehicle, and a wireless Internet interface for receiving commercial advertising. The commercial advertising is able to be output in connection or together with the suggested route or the map display, to an operator of the motor vehicle.

A motor vehicle may be, in particular, a land vehicle that may be used individually in road traffic. For example, motor vehicles are not restricted to land vehicles having an internal combustion engine. A man-machine interface, located in a motor vehicle, may include, for example, a man-machine interface that is part of the motor vehicle.

The foregoing may make it possible to provide an especially high-quality navigation, but may relieve the workload of the vehicle operator in connection with log-in procedures to cover the cost of the complex infrastructure related therewith. This may be achieved by shifting payment operations from the operator of the vehicle to a third party. In this manner, the operating complexity of the especially high-quality navigation may be kept within limits.

According to an example embodiment of the present invention, a navigation system for a motor vehicle includes: an off-board navigation system spatially separate from the motor vehicle; a wireless communication connection between the off-board navigation system and the motor vehicle adapted to transmit at least one of (a) a suggested route for the motor vehicle and (b) a map display of an environment of the motor vehicle from the off-board navigation system to the motor vehicle; and a man-machine interface arranged in the motor vehicle adapted to output the at least one of (a) the suggested route and (b) the map display to an operator of the motor vehicle at least one of (a) in connection and (b) together with an additional item of information accessible to a third party.

The wireless communication connection may include a wireless Internet connection.

The display of the additional information may be a function of at least one of (a) a position of the motor vehicle, (b) the time, (c) a search history and (d) a customer preference.

The additional information may be displayable as at least one of (a) text, (b) a logo and (c) an image.

The additional information may be displayable superimposed on the map display.

The additional information may be outputtable in acoustic form.

According to an example embodiment of the present invention, a navigation system for a motor vehicle includes: an off-board navigation system spatially separate from the motor vehicle; a wireless communication connection between the off-board navigation system and the motor vehicle adapted to transmit at least one of (a) a suggested route for the motor vehicle and (b) a map display of an environment of the motor vehicle from the off-board navigation system to the vehicle; and a man-machine interface arranged in the motor vehicle adapted to output the at least one of (a) the suggested route and (b) the map display to an operator of the motor vehicle at least one of (a) in connection and (b) together with commercial advertising.

the wireless communication connection may include a wireless Internet connection.

The display of the commercial advertising may be a function of at least one of (a) a position of the motor vehicle, (b) the time, (c) a search history and (d) a customer preference.

The commercial advertising may be displayable as at least one of (a) text, (b) a logo and (c) an image.

The commercial advertising may be displayable superimposed on the map display.

The commercial advertising may be outputtable in acoustic form.

According to an example embodiment of the present invention, a method for operating a navigation system for a motor vehicle, the navigation system including an off-board navigation system spatially separate from the motor vehicle, includes: wirelessly transmitting at least one of (a) a suggested route for the motor vehicle and (b) a map display of an environment of the motor vehicle from the off-board navigation system to the motor vehicle; wirelessly transmitting commercial advertising from the off-board navigation system to the motor vehicle; and outputting the commercial advertising to an operator of the motor vehicle.

The method may include outputting the at least one of (a) the suggested route and (b) the map display to an operator of the motor vehicle.

The method may include outputting the at least one of (a) the suggested route and (b) the map display to an operator of the motor vehicle at least one of (a) in connection and (b) together with the commercial advertising.

The commercial advertising may be displayed in the outputting step as a function of at least one of (a) a position of the motor vehicle, (b) the time, (c) a search history and (d) a customer preference.

The commercial advertising may be displayed in the outputting step as at least one of (a) text, (b) a logo and (c) an image.

The commercial advertising may be displayed in the outputting step superimposed on the map display.

The commercial advertising may be output in the outputting step in acoustic form.

The method may include at least partially accruing revenue generated by the commercial advertising to a manufacturer of the motor vehicle.

The method may include splitting revenue generated by the commercial advertising among a manufacturer of the motor vehicle, a provider of a wireless Internet connection via which the at least one of (a) the suggested route for the motor vehicle and (b) the map display of the environment of the motor vehicle is transmitted from the off-board navigation system to the motor vehicle, and a provider of the map display.

The method may include at least one of (a) providing and (b) promising the operator of the motor vehicle a rebate by the commercial advertising.

The method may include at least one of (a) providing and (b) promising the operator of the motor vehicle a guaranteed parking space by the commercial advertising.

The method may include at least one of (a) expanding and (b) maintaining the navigation system with a portion of revenue generated by the commercial advertising.

The method may include at least partially bearing a cost of an infrastructure for the wireless transmission of the at least one of (a) the suggested route and (b) the map display from the off-board navigation system to the motor vehicle and for at least one route section by at least one sponsor.

The method may include transmitting emergency information from the off-board navigation to the motor vehicle with a greater bandwidth than the commercial advertising.

The method may include offering a user of the motor vehicle a certain option in exchange for a fee.

The method may include transmitting information with respect to a position of the motor vehicle from the motor vehicle to the off-board navigation system.

The method may include making accessible the information with respect to the position of the motor vehicle to third parties in exchange for a fee.

The method may include making available information with respect to an estimated arrival time at a destination to third parties in exchange for a fee.

The method may include logging routes of motor vehicles.

According to an example embodiment of the present invention, a method for operating a navigation system for a motor vehicle includes: calculating a suggested route for the motor vehicle as a function of a financial contribution of a sponsor; and outputting the suggested route to an operator of the motor vehicle.

The navigation system may be off-board from the motor vehicle, and the method may include wirelessly transmitting the suggested route from the off-board navigation system to the motor vehicle.

According to an example embodiment of the present invention, a motor vehicle includes: a navigation system adapted to determine a suggested route for the motor vehicle; a man-machine interface, assigned to the navigation system, adapted to output at least one of (a) the suggested route for the motor vehicle and (b) a map display of an environment of the motor vehicle; and a wireless Internet interface adapted to receive commercial advertising, the commercial advertising outputtable to an operator of the motor vehicle at least one of (a) in connection and (b) together with the at least one of (a) the suggested route and (b) the map display.

Further aspects and details with regard to example embodiments of the present invention are described in greater detail below with reference to the appended Figures.

DETAILED DESCRIPTION

Figure 1:
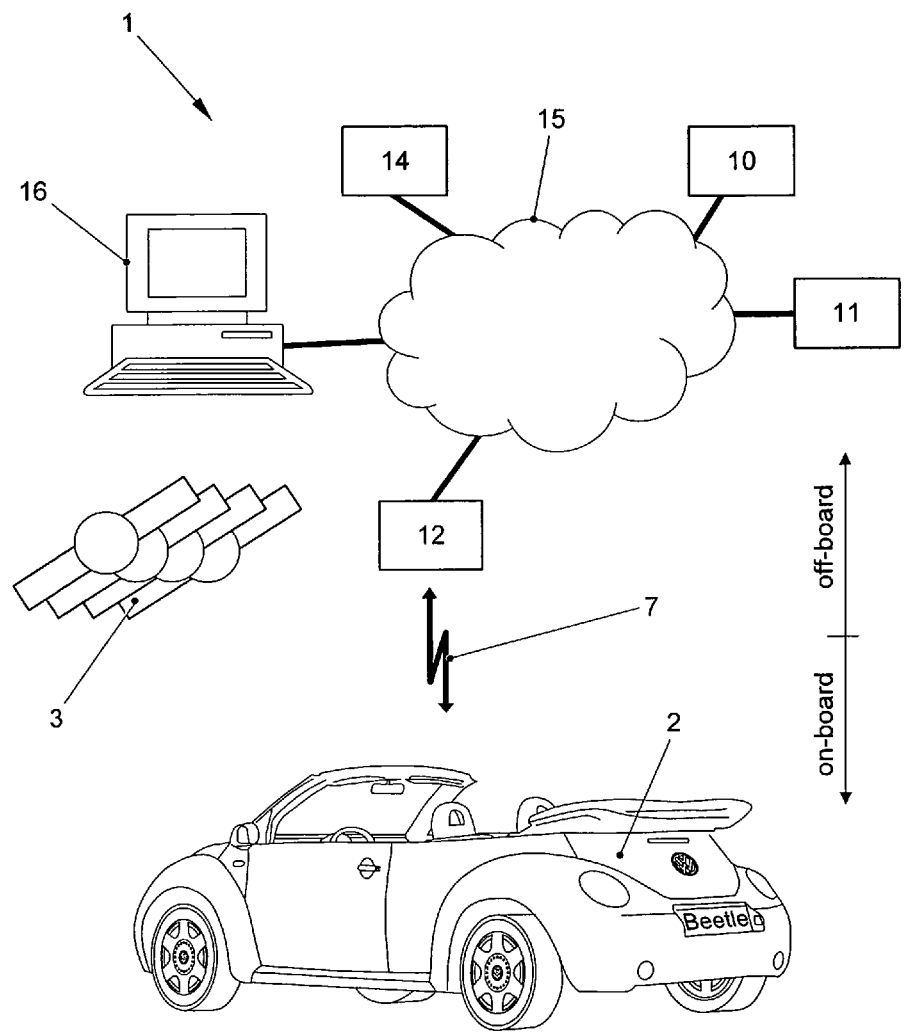
FIG. 1 illustrates an exemplary embodiment of a navigation system for a motor vehicle.
Figure 2:
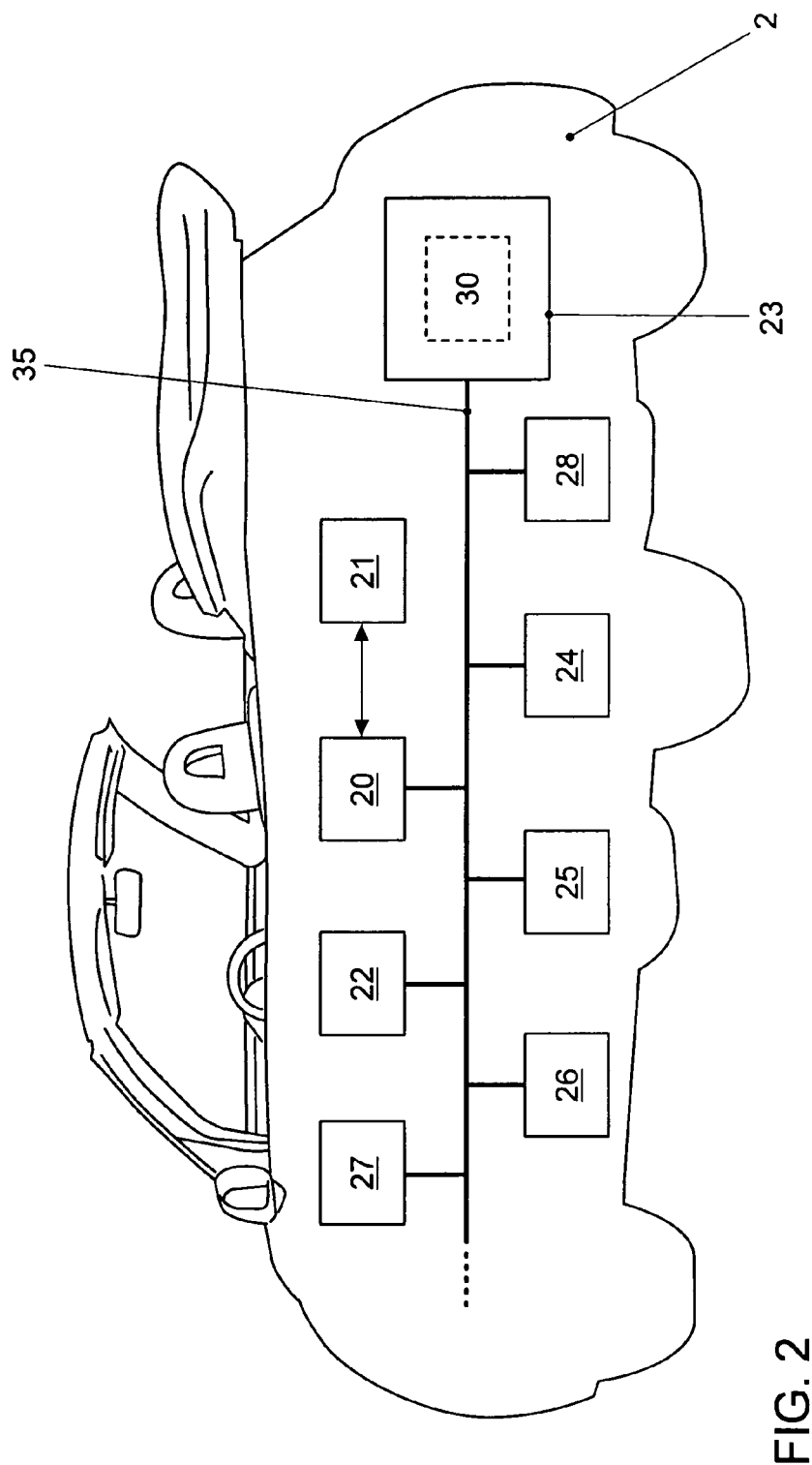
FIG. 2 schematically illustrates an exemplary embodiment of a motor vehicle having a navigation system.

FIG. 1 illustrates an exemplary embodiment of a navigation system 1 for a motor vehicle 2 illustrated in more detail in FIG. 2. Navigation system 1 includes an off-board navigation system 10, spatially separate from motor vehicle 2, for calculating a suggested route (setpoint route to a destination and/or setpoint direction of travel) for vehicle 2, which is transmittable from off-board navigation system 10 to vehicle 2 with the aid of a wireless Internet connection.

To implement the wireless Internet connection, navigation device 1 has nodes 11, 12, 14, which allow wireless access to Internet 15. A wireless communication connection 7 may be arranged between nodes 11, 12, 14 and motor vehicle 2. Wireless communication connection 7 is a WLAN, for example. However, it may also be provided to implement a wireless communication connection 7 as WIFI connection, WIMAXI connection, RFI connection, mobile radio communication connection, etc. It may also be provided that a selection among alternative wireless communication connections may be made (e.g., automatically) as a function of certain criteria. These criteria may include, for example, cost, availability and/or bandwidth, etc. The data exchange within navigation system 1 may be performed in encrypted form.

Furthermore, via Internet 15, a data exchange between off-board navigation system 10 and another terminal 16 is possible. Other terminal 16 or an operator of other terminal 16 may be a third party.

Motor vehicle 2, illustrated in FIG. 2, includes a man-machine interface configured as touch screen 21 for outputting the suggested route to an operator of motor vehicle 2. To this end, touch screen 21 is controllable with the aid of a display control unit 20, which is connected via a bus system 35 to an interface 22 (Internet interface) for wireless communication connection 7. Touch screen 21 may also be utilized to operate an infotainment system 24, a telephone 25, and/or a climate control system 26, etc.

Motor vehicle 2 includes a position-finding system 30—e.g., one integrated into an on-board navigation system 23—for determining the position of motor vehicle 2, the heading of motor vehicle 2, and/or the on-board time as a function of signals transmitted by satellites 3. The position of motor vehicle 2, the heading of motor vehicle 2, and/or the on-board time are transmittable to off-board navigation system 10 via wireless communication connection 7. The position of motor vehicle 2 may also be a variable from which the position of motor vehicle 2 is ascertainable, such as GPS signals received by motor vehicle 2. If, for example, the GPS signals received by the motor vehicle are transmitted to off-board navigation system 10, then it ascertains the position of motor vehicle 2 and the orientation of motor vehicle 2, and possibly the on-board time.

Using touch screen 21, a destination may be input as well, which is transmittable to off-board navigation system 10 via wireless communication connection 7. Off-board navigation system 10 ascertains the suggested route as a function, among others, of the position of motor vehicle 2 and the desired destination and transmits it to motor vehicle 2 via wireless communication connection 7. Furthermore, off-board navigation system 10 is able to transmit commercial advertising to motor vehicle 2. The suggested route and possibly the commercial advertising are displayable in a form integrated into a satellite image or a 3-D graphical representation, e.g., with the aid of off-board navigation system 10, and/or transmittable in this form to the motor vehicle and displayable via touch screen 21. It may be provided that an operator may adjust the viewing angle (e.g., from a plan view to a first-person view via a bird's-eye view, and vice versa).

With regard to the transmission of the suggested route into a satellite image and/or a 3-D graphical representation or a different set of map data, or with regard to the transmission of satellite images and/or 3-D graphical representations or other sets of map information, the following strategies referred to as predictive catching, tunnel vision, and profile-based prediction in the following text may be provided for displaying the suggested route. In the case of predictive catching, only satellite images and/or three-dimensional graphical representations or other map data that are actually needed are transmitted. In the case of the "tunnel vision" strategy, only satellite images and/or 3-D graphical representations or other map data along the suggested route are transmitted with a high information density. On the other hand, satellite images and/or 3-D graphical representations or other map data on the periphery of the route are transmitted with a low information density. In the case of the "profile-based prediction" strategy, satellite images and/or 3-D graphical representations or other map data are transmitted in a form adjusted to the preferences of an operator. The suggested route and the satellite images and/or the 3-D graphical representations or other map data may be stored in a memory denoted by reference numeral 28.

With regard to the satellite images, it may be provided that one is able to select from among different modes, such as night mode, day mode, seasonally dependent modes, weather-dependent modes, etc. It may also be provided that a map, a satellite image, and/or a 3-D graphical representation is supplemented with information from on-board sensor system 27 (night vision, road-condition sensor system).

Figure 3:
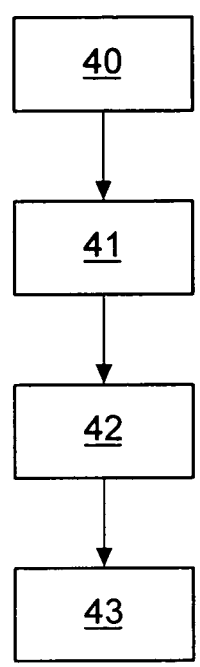
FIG. 3 illustrates a method sequence for supporting a navigation system such as that illustrated in FIG. 1.

FIG. 3 illustrates a method sequence for aiding navigation system 1. In a step 40, a corresponding query of a third party occurs for placement of commercial advertising or with reference to sponsoring. The query may be implemented via Internet 15, e.g., with the aid of terminal 16. However, the query may occur in a different manner as well.

Step 40 is followed by a step 41 in which the commercial advertisement or the sponsoring takes place. For example, a corresponding commercial advertisement may be imported into off-board navigation system 10 in step 41, for example. It may also be provided that, in step 41, the third party is given access to information with respect to the position of motor vehicle 2, e.g., in an anonymized manner (e.g., for a fee). In this context, access to processed information regarding the positions of a plurality of motor vehicles, e.g., may be given. The information regarding the position of the motor vehicle or the processed information regarding the positions of a plurality of motor vehicles may be used to collect road tolls, improve the map displays, ascertain traffic information and/or optimize the traffic flow, etc.

It may also be provided that, in step 41, the third party is provided with information with respect to an estimated arrival time of the motor vehicle at a destination, e.g., in anonymized manner (e.g., for a fee). With the aid of this information, the third party is able to implement a bottleneck management, for example, with respect to facilities such as parking facilities, hotels, etc.

It may also be provided that routes of motor vehicles are recorded in step 41 and made accessible to the third party (e.g., for a fee). With the aid of such information it is possible to make decisions regarding advertising along the road.

It may also be provided that the third party may have a say in the suggested route. If this is desired, a corresponding priorization of a route or specific route segments is exported to off-board navigation system 10 in step 41.

Step 41 is followed by a step 42 in which payment for the commercial advertising or the sponsoring takes place. Step 42 is followed by a step 43 in which the collected monies are apportioned. It may be provided, for example, that the revenue generated with the aid of the commercial advertising or sponsoring are accrued at least partially to the manufacturer of the motor vehicle. It may be provided that the revenue generated by the commercial advertising or sponsoring be split among the manufacturer of the motor vehicle, a provider of nodes 11, 12, 14 or of the data transmission, and a provider of the map display. A portion of the revenue generated by the commercial advertising or sponsoring may at least partially be used to expand and/or maintain navigation system 1. This may involve an infrastructure of navigation system 1 on the off-board or on-board side. If sponsoring of a route segment is provided, a not inconsiderable portion of the revenue from this sponsoring may be used to set up, expand and/or maintain nodes 11, 12, 14 in this route segment and/or to cover the connection fees.

Figure 4:
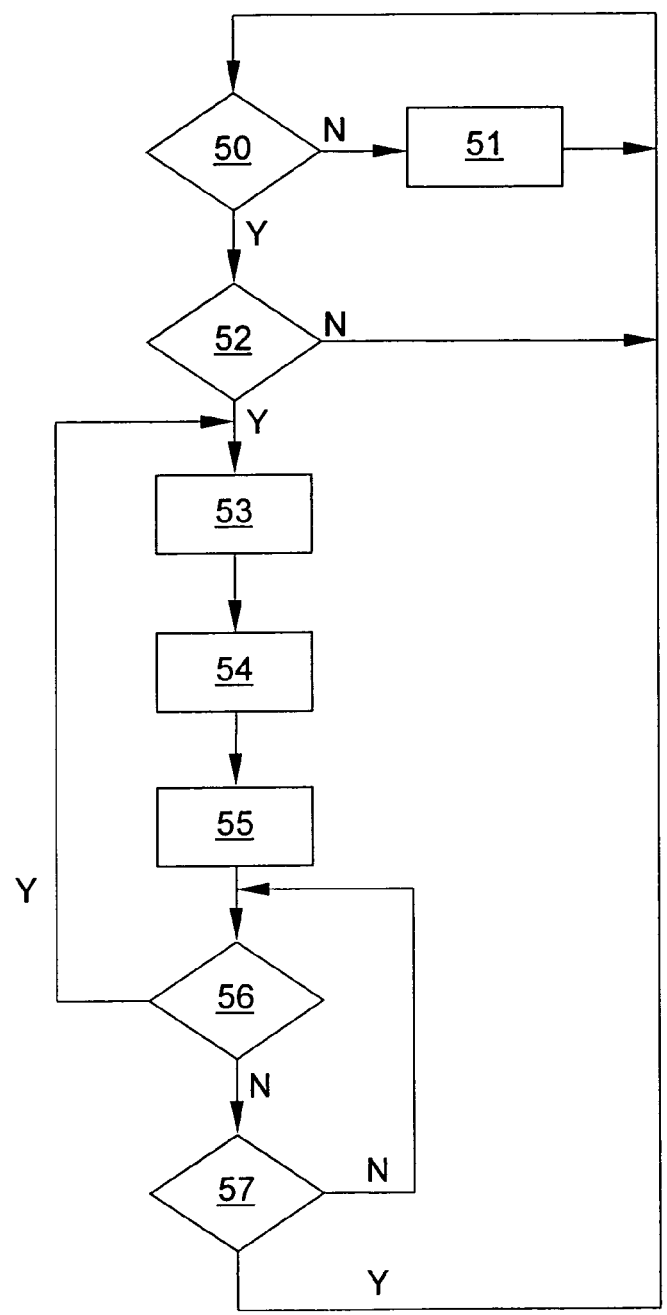
FIG. 4 illustrates a method for operating a navigation system such as that illustrated in FIG. 1.

FIG. 4 illustrates a method sequence to aid in the navigation of motor vehicle 2, e.g., an exemplary embodiment of a method sequence for operating navigation system 1. The method sequence begins with query 50 as to whether communication connection 7 to off-board navigation 10 is available. If communication connection 7 to off-board navigation system 10 is not available, then query 50 is followed by a step 51, which allows the operation of the on-board navigation system. However, if communication connection 7 to off-board navigation system 10 is available, then query 50 is followed by a query 52 as to whether a destination is being entered.

If no destination is entered, query 52 is once again followed by query 50. However, if a destination is input, query 52 is followed by a step 53 in which the position of motor vehicle 2 is determined and in which the desired destination and the position of motor vehicle 2 are transmitted to off-board navigation system 10. Moreover, certain options such as the briefest or fastest possible connection, and also, e.g., confidentiality options that relate to the identity of the user, routes, times, etc., may be transmitted to off-board navigation system 10. It may be provided that confidentiality options are considered only in exchange for a fee.

Step 53 is followed by a step 54, in which a suggested route is ascertained with the aid of off-board navigation system 10 and transmitted to motor vehicle 2. If the placement of commercial advertising, for example, is provided, it will be transmitted to motor vehicle 2. The suggested route is determined as a function of the starting point and the destination point, e.g., as well as the aforementioned options, such as the briefest or fastest possible connection. Moreover, it may be provided that alternative suggested routes are determined for the motor vehicle, and a suggested route for the motor vehicle is selected from among substantially equal suggested routes as a function of a financial contribution by a sponsor.

Step 54 is followed by a step 55, in which the suggested route is displayed by touch screen 21. Furthermore, if the placement of commercial advertising is provided, for example, it is output to an operator of motor vehicle 2, for example, by display on touch screen 21. For example, with regard to a route preview, it is possible to output the commercial advertising in connection or together with the output of the suggested route or a map display. This may be done especially for facilities such as service stations, gas stations, repair shops, car dealers, hotels, motels, restaurants, etc. Furthermore, it may be provided that the commercial advertising is displayed as a function of the position of motor vehicle 2, the time, a search history and/or a customer preference, etc. This may mean that the type of display of the commercial advertising is made dependent on this information and/or that it is made dependent on this information whether a display of the commercial advertising takes place at all. The commercial advertisement may be displayed as text, a logo and/or an image, etc. It may be provided that the commercial advertising is displayed by superimposing it on the map display. As an alternative or in addition to the display of the commercial advertising on touch screen 21, the commercial advertising may also be output in acoustic form.

The contents of the commercial advertising may be restricted to praising a product or a facility. However, it may also be provided that a rebate is granted or promised with the aid of the commercial advertising. This may involve, for example, commercial advertising for service stations, gas stations, repair facilities, car dealers, hotels, motels, restaurants, etc. It is possible to provide exclusive price agreements between the manufacturer of the motor vehicle and the company that advertises by the commercial advertising. As an alternative or in addition, the commercial advertising may be used to grant or promise a guaranteed parking space.

Step 55 is followed by a query 56 as to whether the suggested route should be recalculated and can be recalculated (e.g., on the basis of existing communication connection 7). If the suggested route should and can be newly calculated, step 53 follows query 56. Otherwise, query 56 will be followed by a query 57 as to whether the method sequence is to be terminated. If the method sequence is to be terminated, query 50 follows query 56. Otherwise query 56 follows query 57.

Figure 5:
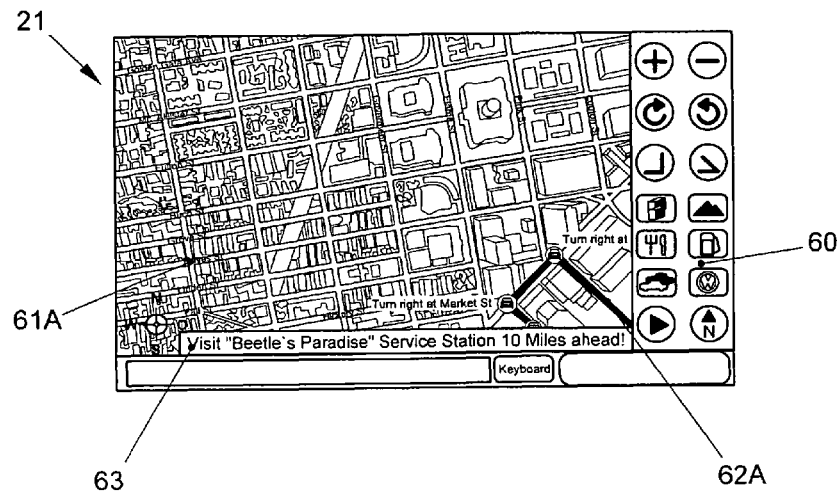
FIG. 5 illustrates a plan view of a route integrated into a 3-D graphical representation, via a touch screen.
Figure 6:
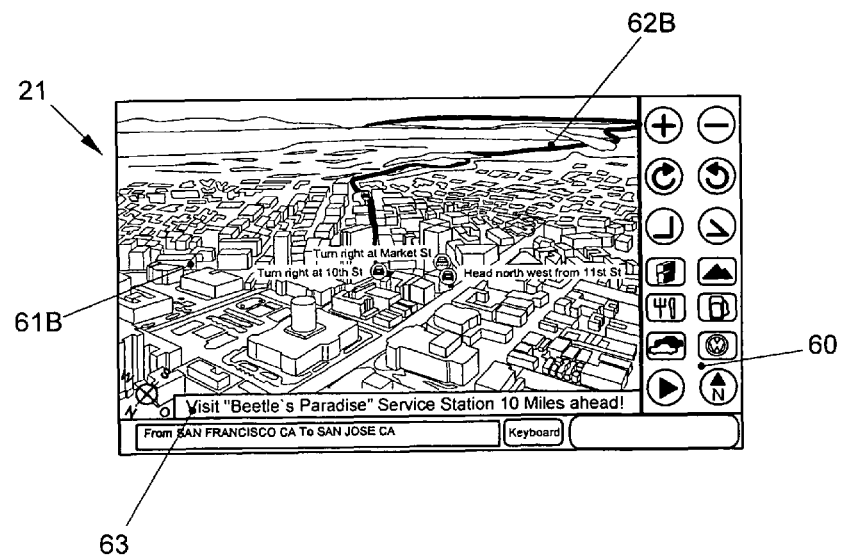
FIG. 6 illustrates a bird's-eye view of a route integrated into a 3-D graphical representation, via a touch screen.

FIG. 5 illustrates an exemplary embodiment of a plan-view illustration 61A of a suggested route 62A integrated in a 3D-graphical representation, using touch screen 21. In this view, additional information such as points of interest (POIs) and/or commercial advertising may be entered as well. As an alternative or in addition, it is possible—as provided in the exemplary embodiment illustrated in FIG. 5—to superimpose an advertising field 63 to display commercial advertising. In addition to plan view 61A of the 3D graphical representation, a toolbar 60 is displayed. With the aid of this toolbar 60, the display may be changed, and/or other and/or additional functions may be activated or controlled. Thus, toolbar 60 may be used to change plan view 61A of the 3-D graphical representation, selected in FIG. 5, into a bird's-eye view 61B, as illustrated in FIG. 6. Accordingly, suggested route 62B will be displayed in a form integrated in the bird's-eye view.

Figure 7:
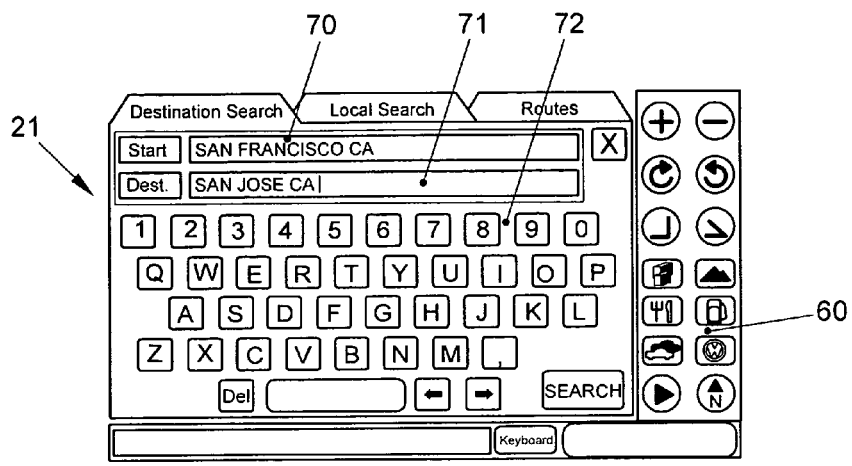
FIG. 7 illustrates a display of an input mask for inputting a starting point and a destination, via a touch screen.

FIG. 7 illustrates an exemplary embodiment of a display of an input mask for inputting a starting and destination point with the aid of touch screen 21. In the exemplary embodiment illustrated, a starting point input field 70 and a destination input field 71 are provided for this purpose. The destination may be entered, e.g., alphanumerically, using a displayed keyboard 72. Alternatively, or in addition, the destination may also be entered via voice input or character recognition (e.g., a character recognition system for identifying Asiatic characters). A location may be selected on a map, a satellite image, and/or a 3-D graphical representation, etc. A zoom function for the map, the satellite image, and/or the 3-D graphical representation, etc., may be provided. The starting position may also be the current position of motor vehicle 2.

Figure 8:
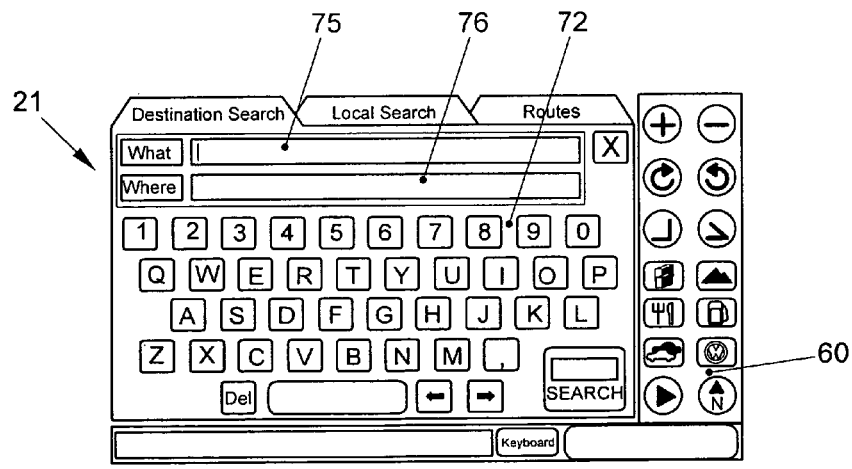
FIG. 8 illustrates a display of an input mask for selecting a destination, via a touch screen.

As illustrated in FIG. 8, it may also be provided that an operator of motor vehicle 2 is able to search for a particular object (e.g., restaurant, landmark, store, gas station, etc.) in a particular search area (e.g., street, city, postal code, district, etc.). To this end, an input mask having an object-input field 75 for inputting an object to be searched for (e.g., restaurant, landmark, store, gas station, etc.) and an area-input field 76 for inputting the search area (e.g., street, city, postal code, district, etc.) are displayed. The operator may then select a hit from the hits ascertained with the aid of this search and offered with the aid of this search (e.g., in a map, in a satellite image, and/or in a 3-D graphical representation, etc.).

Figure 9:
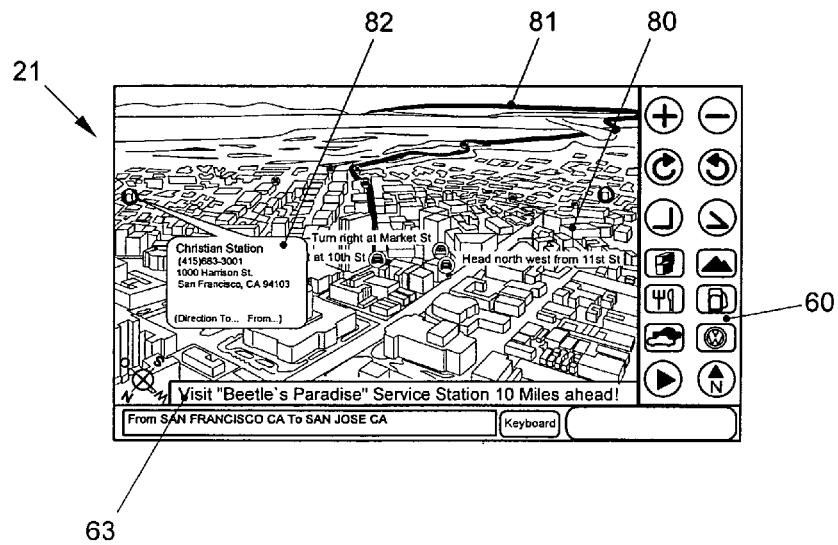
FIG. 9 illustrates a display for selecting preferred routes, via a touch screen.

If the destination is entered via voice input, then the voice input may be confirmed graphically 82, as illustrated in FIG. 9. As illustrated in FIG. 9, this graphic confirmation 82 may, for example, overlap a map display for a limited period of time. Thus, as FIG. 9 illustrates, for example, a bird's-eye view 80 of a suggested route 81 is integrated into a 3-D graphical representation, via touch screen 21.

Figure 10:
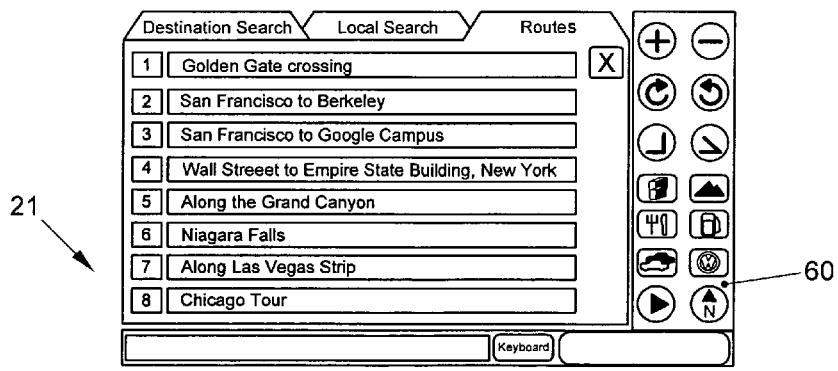
FIG. 10 illustrates a display of an overall view of a route, via a touch screen.

It may also be provided that preferred routes are selectable. FIG. 10, for example, illustrates an exemplary embodiment of a display for the selection of preferred routes, using touch screen 21. Sponsors may be able to influence the sequence of the routes in exchange for the payment of specific fees.

Automatic destination selection or at least interactively automatic destination selection may also be provided under certain conditions. Thus, it may be provided that motor vehicle 2 transmits operational data of motor vehicle 2 (e.g., via wireless communication device 7) or transmits operational data of motor vehicle 2 (e.g., via wireless communication connection 7) to off-board navigation system 10. In this regard, operational data of the motor vehicle may include the status of the fuel tank level, the oil level, information regarding a defect, etc. If, for example, information that the tank is almost empty is transmitted, then navigation to the next gas station is offered and/or provided. If, for example, information that a specific defect is present is transmitted, then navigation to the next (e.g., suitable) service station is offered and/or provided.

Figure 11:
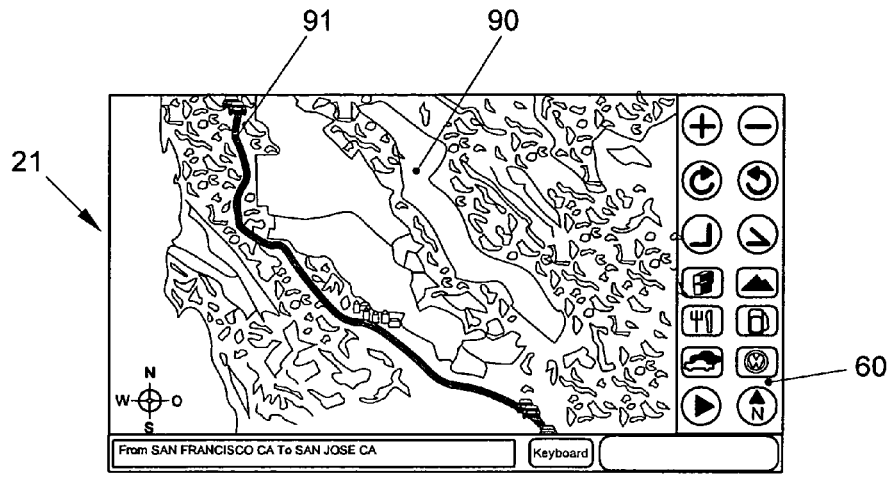
FIG. 11 illustrates a display for activating a voice input, via a touch screen.

FIG. 11 illustrates an exemplary embodiment of a display of a route overview by touch screen 21. Reference numeral 90 denotes a satellite image, and reference numeral 91 denotes a suggested route. The overall view of the route may also be implemented in a fly-through mode, e.g., from a bird's-eye view.

Figure 12:
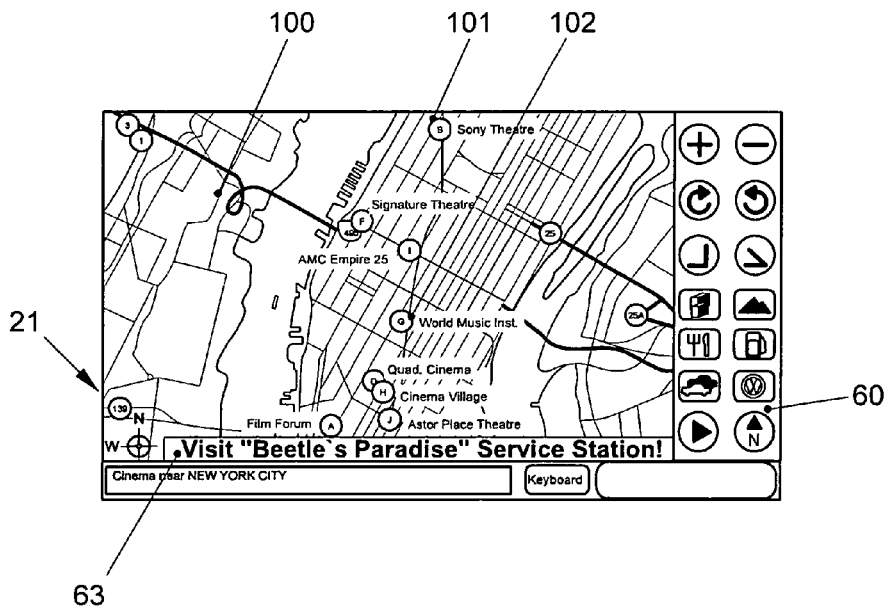
FIG. 12 illustrates a display of a satellite image supplemented by information, via a touch screen.

As illustrated in FIG. 12, satellite images 100 may also be superposed or supplemented with additional information 101 and 102, such as streets, street names or designations, buildings, vehicles, traffic information, POIs (e.g., optionally customized), call-out boxes, rest areas, etc. Special references to rest areas or parking areas may be provided, for example, when a specific driving time has been exceeded. It may be provided that the display of this additional information 101 and 102 is implemented as a function of sponsor or advertising moneys. If additional information 101 is sponsored, for example, but additional information 102 is not, the display of additional information 101 is provided in red, for example, whereas the display of additional information 102 is implemented in gray, for example. Moreover, it is possible to store behind the symbol of sponsored additional information 101 a menu or a pop-up window with additional information, which is called up when a user touches touch screen 21 in the region of additional information 101.

A follow-me function may also be provided, where the position of another selected motor vehicle is entered on a map, a satellite image, and/or a 3-D graphical representation, etc., e.g., in conjunction with the position of motor vehicle 2. In addition, a suggested route may be displayed.

LIST OF REFERENCE SYMBOLS

1 Navigation System
2 Motor Vehicle
3 Satellite
7 Communication Connection
10 Off-Board Navigation System
11, 12, 14 Node
15 Internet
16 Terminal
20 Display Control Unit
21 Touch Screen
22 Interface
23 On-Board Navigation System
24 Infotainment System
25 Telephone
26 Climate Control System
27 On-Board Sensor System
28 Memory
30 Position-Finding System
35 Bus System
40, 41, 42, 43,
51, 53, 54, 55 Step
50, 52, 56, 57 Query
60 Toolbar
61a Plan View
61b, 80 Bird's-Eye View
62a, 62b, 81
91 Suggested Route
63 Advertising Field
70 Starting-Point Input Field
71 Destination Input Field
72 Keyboard
75 Object Input Field
76 Area Input Field
82 Graphic Confirmation
90, 100 Satellite Image
101, 102 Additional Information

What is claimed is:

1. A navigation system for a motor vehicle, comprising:
    an off-board navigation system spatially separate from the motor vehicle;
    a wireless communication connection between the off-board navigation system and the motor vehicle adapted to transmit at least one of (a) a suggested route for the motor vehicle and (b) a map display of an environment of the motor vehicle from the off-board navigation system to the motor vehicle; and
    a man-machine interface arranged in the motor vehicle adapted to output the at least one of (a) the suggested route and (b) the map display to an operator of the motor vehicle at least one of (a) in connection and (b) together with an additional item of information accessible to a third party;
    wherein the at least one of (a) the suggested route and (b) the map display is selected based on a financial contribution associated with the additional information.

2. The navigation system according to claim 1, wherein the wireless communication connection includes a wireless Internet connection.

3. The navigation system according to claim 1, wherein the display of the additional information is a function of at least one of (a) a position of the motor vehicle, (b) the time, (c) a search history, and (d) a customer preference.

4. The navigation system according to claim 1, wherein the additional information is displayable as at least one of (a) text, (b) a logo and (c) an image.

5. The navigation system according to claim 1, wherein the additional information is displayable superimposed on the map display.

6. The navigation system according to claim 1, wherein the additional information is outputtable in acoustic form.

7. A navigation system for a motor vehicle, comprising:
    an off-board navigation system spatially separate from the motor vehicle;
    a wireless communication connection between the off-board navigation system and the motor vehicle adapted to transmit at least one of (a) a suggested route for the motor vehicle and (b) a map display of an environment of the motor vehicle from the off-board navigation system to the vehicle; and
    a man-machine interface arranged in the motor vehicle adapted to output the at least one of (a) the suggested route and (b) the map display to an operator of the motor vehicle at least one of (a) in connection and (b) together with commercial advertising;
    wherein the at least one of (a) the suggested route and (b) the map display is selected based on a financial contribution associated with the commercial advertising.

8. The navigation system according to claim 7, wherein the wireless communication connection includes a wireless Internet connection.

9. The navigation system according to claim 7, wherein the display of the commercial advertising is a function of at least one of (a) a position of the motor vehicle, (b) the time, (c) a search history and (d) a customer preference.

10. The navigation system according to claim 7, wherein the commercial advertising is displayable as at least one of (a) text, (b) a logo and (c) an image.

11. The navigation system according to claim 7, wherein the commercial advertising is displayable superimposed on the map display.

12. The navigation system according to claim 7, wherein the commercial advertising is outputtable in acoustic form.

* * * * *